(12) United States Patent
Hemingway et al.

(10) Patent No.: US 8,959,730 B2
(45) Date of Patent: Feb. 24, 2015

(54) PUSH-ON CLIP FASTENER

(75) Inventors: Todd Hemingway, Metamora, MI (US);
Walter Pipp, Birmingham, MI (US);
Mike Danby, Stoney Creek (CA);
Charles A. Deperro, Sterling Heights, MI (US)

(73) Assignee: A. Raymond et Cie (DE)

( * ) Notice: Subject to any disclaimer, the term of this patent is extended or adjusted under 35 U.S.C. 154(b) by 99 days.

(21) Appl. No.: 12/890,126

(22) Filed: Sep. 24, 2010

(65) Prior Publication Data

US 2011/0072625 A1  Mar. 31, 2011

Related U.S. Application Data

(60) Provisional application No. 61/245,525, filed on Sep. 24, 2009.

(51) Int. Cl.
*A44B 17/00* (2006.01)
*F16B 37/08* (2006.01)

(52) U.S. Cl.
CPC .................. *F16B 37/0842* (2013.01)
USPC .............. 24/453; 24/457; 24/291; 24/581.11; 411/433

(58) Field of Classification Search
CPC ................ F16B 5/0266; F16B 5/128
USPC ......... 411/526, 190–194, 427, 431, 436, 438, 411/433, 437, 900–904, 918, 270, 266, 267, 411/188, 187, 510, 432, 75, 78; 24/453, 24/573.09, 573.11, 580.1, 591.1, 633, 639, 24/642, 653–654, 656, 664, 581.11, 581.1, 24/595.1, 457, DIG. 47, 614, 615, 459, 24/336, 289–291, 297, DIG. 31, DIG. 35, 24/171, 477; 248/68.1, 65, 67.7, 73, 71, 248/49, 316.1, 316.3, 316.2
See application file for complete search history.

(56) References Cited

U.S. PATENT DOCUMENTS 1,390,564 A * 9/1921 Knorr .......................... 285/243
3,037,542 A * 6/1962 Boyd ............................ 411/105
(Continued)

FOREIGN PATENT DOCUMENTS

DE 19628461 1/1997
GB 2154648 A 9/1985

OTHER PUBLICATIONS

International Search Report and the Written Opinion, Dec. 3, 2010, A Raymond et Cie.
(Continued)

*Primary Examiner* — Robert J Sandy
*Assistant Examiner* — Abigail Morrell
(74) *Attorney, Agent, or Firm* — McDonald Hopkins LLC

(57) ABSTRACT

A push-on clip fastener for securing two components together, such as interior automotive components. The push-on clip fastener includes a housing, a cover and a spring. The housing may include an aperture, wherein the housing may be capable of being located over a stud to secure an interior automotive component there between. The cover may include a pair of legs, wherein the cover may be insertable into the housing. The legs may be inserted into the housing cause the spring to straighten. The spring may include a slot, wherein the slot may be aligned with the aperture in the housing. The straightening of the spring may cause a clamp load. The housing may also include projections located on each side of the housing. The cover may also include retaining features located on each side of the cover that may be engageable with the housing projections to secure the fastener together.

19 Claims, 5 Drawing Sheets

(56) References Cited

U.S. PATENT DOCUMENTS

| | | | |
|---|---|---|---|
| 3,905,411 A * | 9/1975 | Dzus et al. | 411/278 |
| 4,802,804 A | 2/1989 | Hirohata | |
| 4,850,778 A * | 7/1989 | Clough et al. | 411/433 |
| 4,899,964 A * | 2/1990 | Sick | 248/68.1 |
| 5,355,562 A * | 10/1994 | Matoba et al. | 24/625 |
| 5,816,762 A * | 10/1998 | Miura et al. | 411/433 |
| 6,179,539 B1 * | 1/2001 | Benoit et al. | 411/433 |
| 6,729,822 B2 * | 5/2004 | Sbongk | 411/433 |
| 6,974,291 B2 * | 12/2005 | Li | 411/437 |
| 7,179,038 B2 * | 2/2007 | Reindl | 411/433 |
| 2005/0008456 A1 | 1/2005 | Birkelbach et al. | |
| 2007/0248436 A1 * | 10/2007 | Sano | 411/175 |
| 2009/0087279 A1 | 4/2009 | McGinn et al. | |

OTHER PUBLICATIONS

International Preliminary Report on Patentability, Apr. 5, 2012, A Raymond et Cie.

* cited by examiner

US 8,959,730 B2

PUSH-ON CLIP FASTENER

CROSS-REFERENCE TO RELATED APPLICATION

This application claims benefit from U.S. Provisional Patent Application No. 61/245,525, entitled "Push-On Fastener," filed on Sep. 24, 2009, which is hereby incorporated by reference in its entirety.

FIELD OF THE INVENTION

The present invention generally relates to fasteners and, more particularly, to a push on clip for securing one or more components together.

BACKGROUND

Typically, fastening devices, such as clips, may be utilized for securing various components together. In addition, a variety of fastening devices may be used within a variety of industries, such as the automotive industry, for coupling various types of components together.

During the installation of various types of components or products, it may be necessary to secure two or more components together. Many difficulties may be encountered during the manufacture and assembly of components. For example, various components of products to be secured together may require different tools in order to assemble the components. As a result, the use or necessity of a variety of tools may be time consuming and costly for manufacturers.

In addition, the installation of some components may be difficult due to limited access, whereby only one side of the components may be accessible. Furthermore, it may be frequently desirable to permit consumers or others to be able to access a fastener that secures the components, to, for example, repair the components, repair the fastener, exchange the components, clean the components, or for other reasons.

SUMMARY

A push-on clip fastener is described. The push-on clip fastener may be utilized to secure two components together, such as interior automotive components. The push-on clip fastener may include a housing, a cover and a spring. The housing may include an aperture, wherein the housing may be capable of being located over a stud to secure an interior automotive component there between. The cover may include a pair of legs, wherein the legs may be insertable into the housing. The legs inserted into the housing may cause the spring to straighten and tighten around the stud. The spring may include a slot, wherein the slot may be aligned with the aperture in the housing. The straightening of the spring may cause a clamp load. The housing may also include projections located on each side of the housing. The cover may also include retaining features located on each side of the cover that may be engageable with the housing projections to secure the fastener together.

BRIEF DESCRIPTION OF THE DRAWINGS

Objects and advantages together with the operation of the invention may be better understood by reference to the following detailed description taken in connection with the following illustrations, wherein.

DETAILED DESCRIPTION

Reference will now be made in detail to exemplary embodiments of the present invention, examples of which are illustrated in the accompanying drawings. It is to be understood that other embodiments may be utilized and structural and functional changes may be made without departing from the respective scope of the invention. As such, the following description is presented by way of illustration only and should not limit in any way the various alternatives and modifications that may be made to the illustrated embodiments and still be within the spirit and scope of the invention.

A push-on clip fastener is described in FIGS. 1-9. The various embodiments of the push-on clip fastener may permit the operator to push the fastener onto a stud S with a low force requiring no tools. The stud S may be located at any appropriate position or utilized within any appropriate type of application, such as within an automotive application or environment. When the push-on clip fastener is installed, the push-on clip fastener may hold a high axial load. In some of the embodiments, of the push-on clip fastener may self tighten when the part is installed. In other embodiments, the push-on clip fastener may passively tighten by virtue of the geometry and design. Additional embodiments of the push-on clip fastener may require a "quarter turn" to generate the clamp load.

The push-on clip fastener may be utilized in numerous applications and may be quickly installed to reduce manufacturing time and expense. The various embodiments of the push-on clip fastener may be utilized to secure any appropriate type of interior automotive components. For example, the push-on clip fastener may mount these components onto studs S that may already have been provided within the automotive interior. The push-on clip fastener may be used to mount a variety of types of components. For example, the push-on clip fastener may be utilized to mount the air bags to the studs, such as a side curtain air bag to be mounted to a roof rail. The push-on clip fastener may also be utilized to mount interior automotive lamps, trim components, electronic components and the like. The push-on clip fastener may be utilized mount these components behind trim panels.

Figure 1:
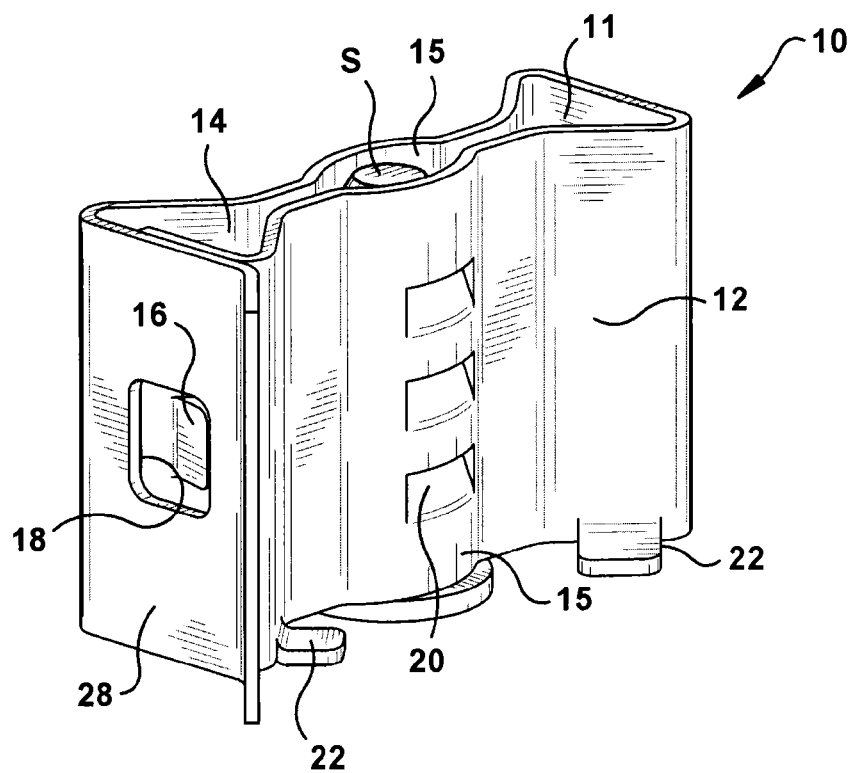
FIG. 1 illustrates a perspective view of a pinch clip fastener in an embodiment of the invention.
Figure 2:
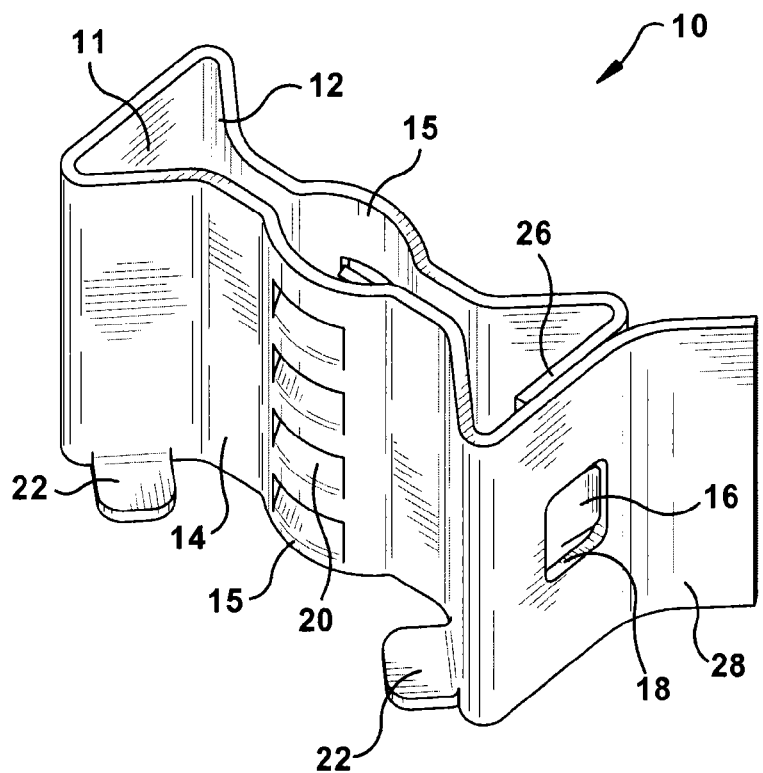
FIG. 2 illustrates another perspective view of the pinch clip fastener of FIG. 1.

An embodiment of the push-on clip fastener is illustrated in FIGS. 1 and 2. FIGS. 1 and 2 illustrate an embodiment directed to a pinch clip fastener 10. The pinch clip fastener 10 may be of any appropriate shape, size, type or configuration. The pinch clip fastener 10 may be fabricated by any appropriate means and out of any appropriate materials, such as being fabricated as a one-piece stamped product made from spring steel.

The pinch clip fastener 10 may include a support column 11, a first half or side 12 and a second half or side 14. The support column 11 may be of any appropriate shape, size, type or configuration, such as of a generally planar rectangular or square configuration. The support column 11 may be located at any appropriate position on the pinch clip fastener 10, such as being located at one end of the pinch clip fastener 10. For example, the support column 11 may generally act as a backbone to the pinch clip fastener 10.

The first side 12 may be of any appropriate shape, size, type or configuration, such as of a generally wavy rectangular configuration. The first side 12 may be located at any appropriate position on the pinch clip fastener 10, such as extending generally outwardly from the support column 11. The first side 12 may include a mid-section 15 and a flap 26.

The second side 14 may be of any appropriate shape, size, type or configuration, such as of a generally wavy rectangular configuration. For example, the first side 12 and the second side 14 may generally be of similar configurations, such as a mirror image of one another. The second side 14 may be located at any appropriate position on the pinch clip fastener 10, such as extending generally outwardly from the support column 11. For example, the second side 14 may generally be located opposite that of the first side 12. The second side 14 may include a mid-section 15 and a flap 28.

The mid-sections 15 of the first and second sides 12, 14 may be of any appropriate shape, size, type or configuration, such as a generally semi-circular shape. The mid-section 15 may be located at any appropriate position on the pinch clip fastener 10, such as at an approximate central location on each of the sides 12, 14. The mid-sections 15 may be of a configuration to generally form to the shape of a stud S. The mid-sections 15 may include at least one lance 20.

The mid-sections 15 may include any appropriate number of lances 20, such as two, three or four lances 20 on each mid-section 15. The mid-sections 15 may also have the same or differing number of lances 20. The lances 20 may be fabricated into the pinch clip fastener 10 by any appropriate means, such as by being semi-pierced into each mid-section 15. The lances 20 may be of any appropriate shape, size, type or configuration, such as a generally curved rectangular shape. The lances 20 may be located at any appropriate position on the pinch clip fastener 10, such as generally linearly spaced along the length of each mid-section 15, whereby the lances 20 may be angled in a direction to follow the pitch of threads (not shown) in the stud S.

The flap 26 of the first side 12 may be of any appropriate shape, size, type or configuration, such as of a generally rectangular configuration. The flap 26 of the first side 12 may be located at any appropriate position on the pinch clip fastener 10, such as at an end of the first side 12 opposite that of the support column 11. For example, the flap 26 may generally extend outwardly from the first side 12, whereby the flap 26 and the support column 11 may generally be parallel to one another. The flap 26 of the first side 12 may include a tab 16.

The tab 16 may be of any appropriate shape, size, type or configuration, such as of a generally square or rectangular configuration. The tab 16 may be located at any appropriate position on the pinch clip fastener 10, such as at an approximate central location of the flap 26 of the first side 12 and extending outwardly therefrom. For example, the tab 16 may be stamped into the first side 12.

The flap 28 of the second side 14 may be of any appropriate shape, size, type or configuration, such as of a generally rectangular configuration. For example, the flap 28 may be of a slightly larger size than the flap 26 of the first side 12. The flap 28 of the second side 14 may be located at any appropriate position on the pinch clip fastener 10, such as at an end of the second side 14 opposite that of the support column 11. For example, the flap 26 may generally extend outwardly from the second side 14, whereby the flap 26 and the support column 11 may generally be parallel to one another. In addition, the flap 28 of the second side 14 may generally be located over the flap 26 of the first side 26, whereby the flaps 26, 28 may abut one anther. The flap 28 of the second side 14 may include a slot 18.

The slot 18 may be of any appropriate shape, size, type or configuration, such as generally square or rectangular configuration. For example, the slot 18 may be of a configuration generally shaped and sized to receive the tab 16 therein. The slot 18 may be located at any appropriate position on the pinch clip fastener 10, such as at an approximate central location of the flap 28 of the second side 14. For example, the slot 18 may be located adjacent to the tab 16.

The pinch clip fastener 10 may include at least one orientation tab 22. The pinch clip fastener 10 may include any appropriate number of orientation tabs 22. The orientation tabs 22 may be of any appropriate shape, size, type or configuration, such as of a generally square or rectangular configuration. The orientation tabs 22 may be located at any appropriate position on the pinch clip fastener 10, such as along an edge of both the first side 12 and the second side 14. For example, each side 12, 14 may include a pair of orientation tabs 22, whereby one orientation tab 22 may be located adjacent to the support column 11 and another orientation tab 22 may be located adjacent the respective flaps 26, 28. The orientation tabs 22 may be located on each side 12, 14 to aid in orientation during assembly.

In a non-limiting example, a operator may wrap the pinch clip fastener 10 around the stud S. When the pinch clip fastener 10 is positioned around the stud S, the operator may pinch together the sides 12, 14 of the pinch clip fastener 10 until the tab 16 grabs into the slot 18 on the flaps 26, 28 of the pinch clip fastener 10. As the pinch clip fastener 10 engages the mating stud S, the semi-pierced lances 20 may protrude into the threads of the stud S. These lances 20 may be tipped or angled in a desired direction to follow the pitch of the threads in the stud S. To attain clamp loading the operator may turn the pinch clip fastener 10 a "quarter turn."

Figure 3:
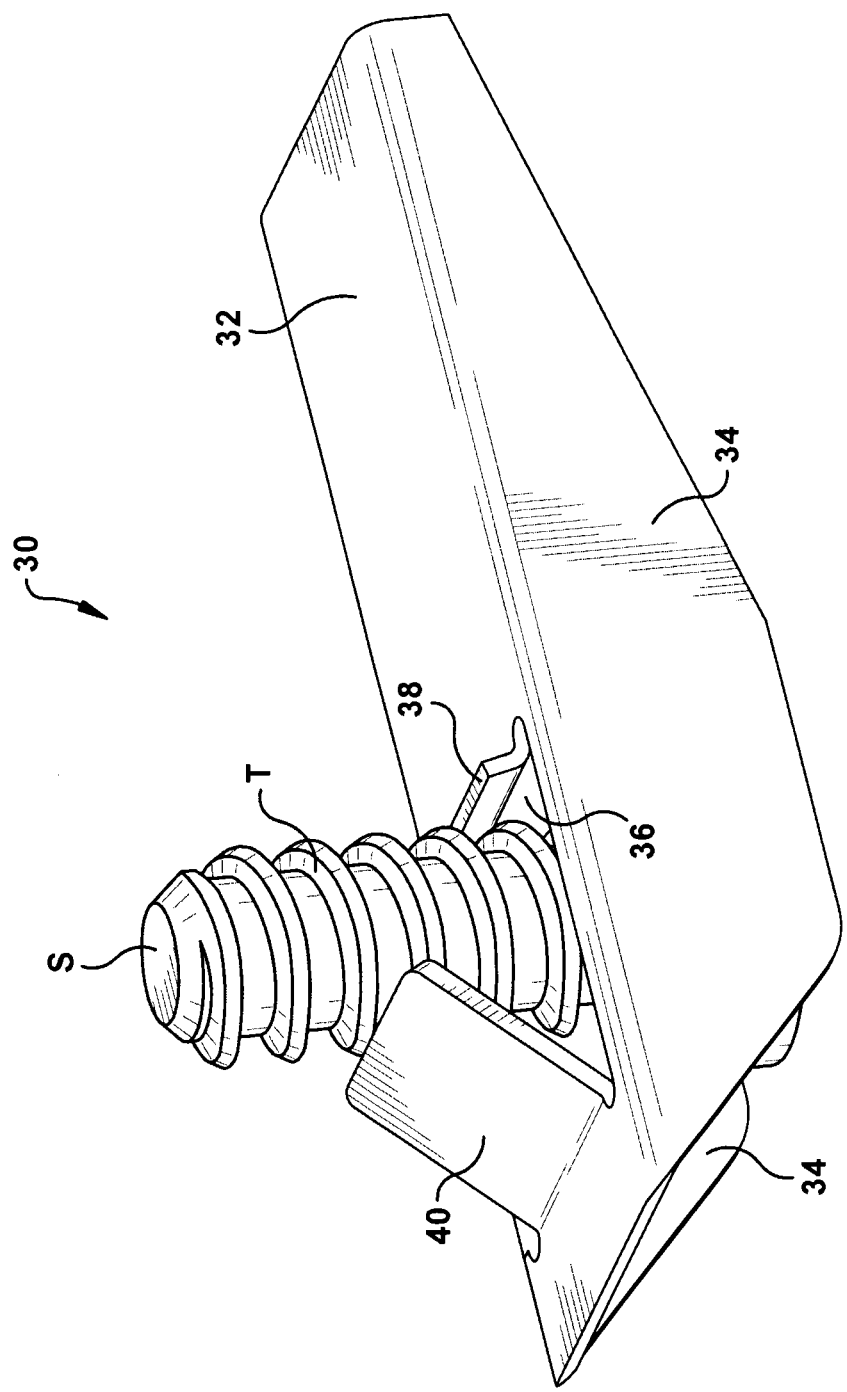
FIG. 3 illustrates a perspective view of a toggle lock clip fastener in an embodiment of the invention.

An alternative embodiment of the push-on clip fastener is illustrated in FIG. 3. FIG. 3 illustrates an embodiment directed to a toggle lock clip fastener 30. The toggle lock clip fastener 30 may be of any appropriate shape, size, type or configuration, such as of a general "U" channel configuration. The toggle lock clip fastener 30 may be fabricated by any appropriate means and out of any appropriate materials, such as being fabricated as a one-piece stamped product made from spring steel.

The general "U" channel shape configuration of the toggle lock clip fastener 30 may include a central wall or plane 32 and a pair of wings 34. The central plane 32 may be of any appropriate shape, size, type or configuration, such as of a generally planar square or rectangular shape. The central plane 32 may be located at any appropriate position on the toggle lock clip fastener 30, such as at an approximate central location. The central plane 32 may include an aperture or cut out 36.

The pair of wings 34 may be of any appropriate shape, size, type or configuration, such as a generally planar square, rectangular or generally triangular configuration. The wings 34 may be located at any appropriate position on the toggle lock clip fastener 30, such as generally extending perpendicularly outward and away from the central plane 32. For example, the wings 34 may be located along each side of the central plane 32, whereby the wings 34 may be generally parallel to each other.

The cut out 36 may be of any appropriate shape, size, type or configuration, such as of a generally square or rectangular shape. The cut out 36 may be located at any appropriate position on the toggle lock clip fastener 30, such as adjacent an end of the central plane 32. The cut out 36 may provide for at least one tab.

The toggle lock clip fastener 30 may include at least one tab. The toggle lock clip fastener 30 may include any appropriate number of tabs, such as a pair of tabs 38, 40. The tabs 38, 40 may be of any appropriate shape, size, type or configuration, such as of a generally square or rectangular shape. The tabs 38, 40 may be of a similar shape and size or they may be of differing shapes and sizes. For example, there may be a short tab 38 and a long tab 40, whereby the long tab 40 is larger and extends a distance farther from the central plane 32 than the short tab 38.

The tabs 38, 40 may be located at any appropriate position on the toggle lock clip fastener 30, such as adjacent the cut out 36. For example, the short tab 38 may be located at one side of the cut out 36 and the long tab 40 may be located at an opposite side of the cut out 36. The tabs 38, 40 may be longitudinally opposed on either side of the cut out 36. The short tab 38 may be designed to be stiff. The long tab 40 may be designed to have leaf spring qualities. In use, the tabs 38, 40 may extend upwardly and outwardly from the central plane 32 any a desired angle.

In a non-limiting example, in a rest position the long tab 40 may position the width of the stud S away from the short tab 38. This may allow the toggle lock clip fastener 30 to easily slip over the stud S during assembly. As the cut out 36 end of the toggle lock clip fastener 30 is slid towards the bottom of the stud S, the operator may press on the opposite end of the toggle lock clip fastener 30, whereby the toggle lock clip fastener 30 may be operated like a lever.

As the toggle lock clip fastener 30 rotates, the space between the long tab 40 and the short tab 38 may constrict. This constriction may causes the long tab 40 to catch onto an under side of the nearest thread T of the stud S. As the long tab 40 includes spring qualities, the long tab 40 may bend under the load. For example, as the long tab 40 is pressed, clamp load may be created between the stud S and the object being clamped, such as an interior automotive component (not shown). As such, the toggle lock clip fastener 30 may not require a "quarter turn" to be assembled.

Figure 4:
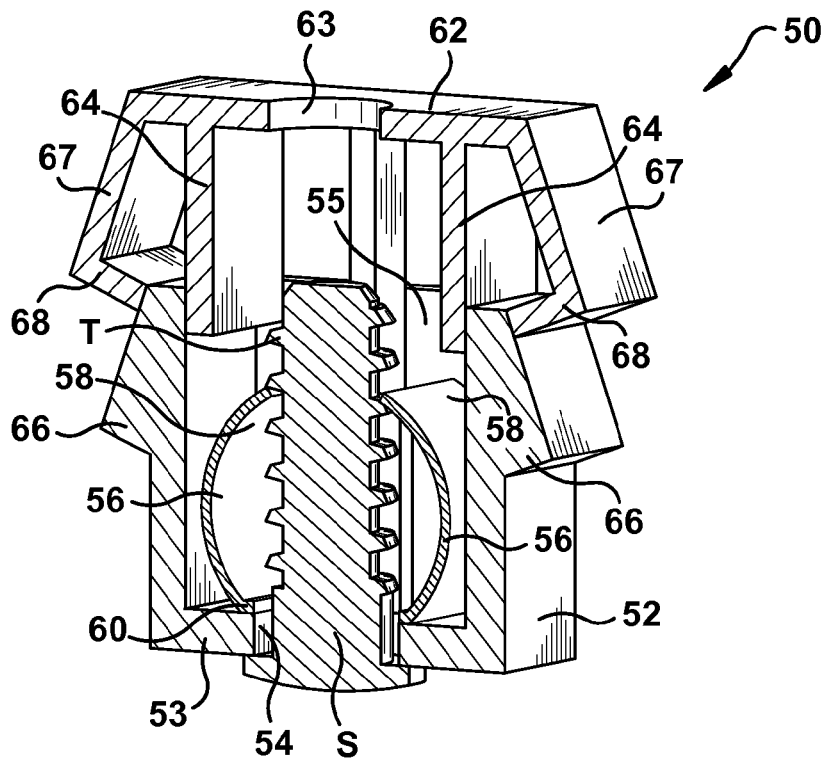
FIG. 4 illustrates a cross-sectional perspective view of a wedge lock clip fastener in an embodiment of the invention prior to assembly.
Figure 5:
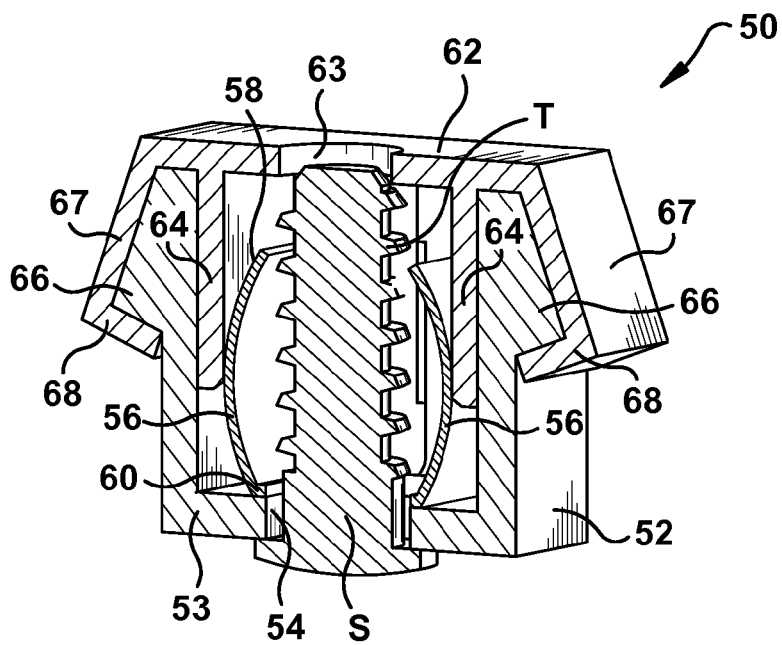
FIG. 5 illustrates another cross-sectional perspective view of the wedge lock clip fastener of FIG. 4 after assembly.

An alternative embodiment of the push-on clip fastener is illustrated in FIGS. 4 and 5. FIGS. 4 and 5 illustrate an embodiment directed to a wedge lock clip fastener 50. The wedge lock clip fastener 50 may be of any appropriate shape, size, type or configuration. The wedge lock clip fastener 50 may be fabricated by any appropriate means and out of any appropriate materials, such as being fabricated as a three-piece assembly. For example, two of the pieces may be injection molded and one of the pieces may be stamped spring steel.

The wedge lock clip fastener 50 may include a housing 52 and a cover 62. The housing 52 may be of any appropriate shape, size, type or configuration, such as of a generally five sided rectangular box with having an open end 55. The housing 52 may be fabricated as an injection molded piece. The housing 52 may be located at any appropriate position on the wedge lock clip fastener 50. The housing 52 may include a base 53.

The base 53 may be of any appropriate shape, size, type or configuration, such as of a generally square or rectangular configuration, similar to that of the housing 52. The base 53 may be located at any appropriate position on the wedge lock clip fastener 50, such as at an end of the housing 52. The base 53 may include an aperture 54. The aperture 54 may be of any appropriate shape, size, type or configuration, such as of a generally circular or square shape. The aperture 54 may be located at any appropriate position on the wedge lock clip fastener 50, such as at an approximate central location of the base 53. A stud S may be inserted into the aperture 54 and located there through.

The open end 55 may be of any appropriate shape, size, type or configuration, such as of a generally square or rectangular shape. For example, the open end 55 may be almost as large as the housing 52. The open end 55 may be located at any appropriate position on the wedge lock clip fastener 50, such as at an end of the housing 52 located opposite that of the base 53.

The housing 52 may include at least one projection 66. The housing 52 may include any appropriate number of projections 66, such as a pair of projections 66. The projections 66 may be of any appropriate shape, size, type or configuration, such as of a generally triangular shape. For example, the projections 66 may generally provide an angled surface on the outside of the housing 52. The projections 66 may be located at any appropriate position on the wedge lock clip fastener 50, such as located on opposite sides of the housing 52.

The cover 62 may be of any appropriate shape, size, type or configuration, such as of a generally square or rectangular configuration. The cover 62 may be fabricated as an injection molded piece. The cover 62 may be located at any appropriate position on the wedge lock clip fastener 50, such as located over and within the open end 55 of the housing 52. The cover 62 may include an aperture 63 and at least one leg 64.

The aperture 63 may be of any appropriate shape, size, type or configuration, such as of a generally circular configuration. The aperture 63 may be located at any appropriate position on the wedge lock clip fastener 50, such as at an approximate central location on the cover 62. For example, the aperture 63 may be located opposite that of the aperture 54 in the base 53, whereby the apertures 54, 63 may be generally aligned when the wedge lock clip fastener 50 is assembled.

The cover 62 may include any appropriate number of legs 64, such as a pair of legs 64. The legs 64 may be of any appropriate shape, size, type or configuration, such as of a generally planar rectangular configuration. The legs 64 may be located at any appropriate position on the wedge lock clip fastener 50, such as located adjacent each side of the cover 62. For example, the legs 64 may be located on opposite sides of the aperture 63, whereby each leg 64 may generally abut the inside of the housing 52 when the wedge lock clip fastener 50 is assembled.

The wedge lock clip fastener 50 may include at least one wing 67. For example, the wedge lock clip fastener 50 may include any appropriate number of wings 67, such as a pair of wings 67. The wings 67 may be of any appropriate shape, size, type or configuration, such as of a generally planar rectangular or square configuration. The wings 67 may be located at any appropriate position on the wedge lock clip fastener 50 such as located at each end of the cover 62. For example, the wings 67 may extend angularly outward from the sides of the cover 62, whereby the angle formed between each leg 64 and the nearest wing 67 may be an acute angle. The wings 67 may include a tab 68.

The tabs 68 may be of any appropriate shape, size, type or configuration, such as of a generally planar square or rectangular configuration. The tabs 68 may be located at any appropriate position on the wedge lock clip fastener 50, such as located at the free ends of the wings 67. For example, tabs 68 may be generally perpendicular to the wings 67 and extend generally inwardly toward the legs 64 of the cover 62.

The wings 67 and tabs 68 of the cover 62 may form a general L-shaped component that may be similar in shape and size to the projections 66 on the housing 52. In use, the wings 67 and tabs 68 may slide over and securely engage the projections 66 on the housing 52, whereby the cover 62 may be snapped onto and secured to the housing 52.

The wedge lock clip fastener 50 may include a spring 56. The spring 56 may be of any appropriate shape, size, type or configuration, such as generally cylindrical. For example, the spring 56 may be cylindrical, whereby a break 58 or ends 58 of the cylinder may be left open. The spring 56 may be fabricated by any appropriate means, such as by being stamped. The spring 56 may be located at any appropriate position on the wedge lock clip fastener 50, such as located within the housing 52. For example, the spring 56 may be located adjacent or abutted to the base 53.

Since the spring 56 may include open ends 58, the spring 56 may appear similar to a hoop except that the hoop may be broken by the axially aligned break 58. The break 58 may be of any appropriate shape, size, type or configuration, such that the break 58 may be approximately the same size as the diameter of a stud S. The break 58 may be located at any appropriate position on the wedge lock clip fastener 50, such as generally aligned with the aperture 54 in the base 53. Opposite the break 58 there may be a slotted hole 60. This slot 60 may be adjacent to, and reasonably aligned to, the aperture 54 in the housing 52.

In a non-limiting example, as the housing 52 and the spring 56 may be slipped over the stud S, and reasonably seated against the object to be retained, such as an interior automotive component, the operator may press the cover 62 into the housing 52. As the cover 62 is pressed into the housing 52, the two legs 64 may act as wedges within the housing 52. As such, the legs 64 may drive the edges of the break 58 of the spring 56 into the stud S.

As one of the edges of the break 58 engage a thread T in the stud S, the slotted hole 60 in the spring 56 may allow the spring 56 to rotate within the housing 52. The spring 56 may distort and rotate until the other edge of the break 58 engages the thread T in the stud S. When both sides of the break 58 are engaged into threads T of the stud S, the cover 62 may continue to wedge the spring 56, thereby causing the spring 56 to straighten.

This straightening may cause the wedge lock clip fastener 50 to generate a clamp load. As such, the wedge lock clip fastener 50 does not require a quarter turn to be assembled. The operator may continue to push the cover 62 onto the housing 52 until the cover tabs 68 snap onto the projections 66 on either side of the housing 52 exterior. In a non-limiting example, there may be a stud S sticking out of an interior automotive panel (not shown). An air bag (not shown) may be slipped over the stud S and then the wedge lock clip fastener 50 may be placed over the stud S, whereby the air bag may be located behind the wedge lock clip fastener 50. The wedge lock clip fastener 50 may then be fully assembled and locked down onto the stud S by pushing the cover 62 down into the housing 52.

Figure 6:
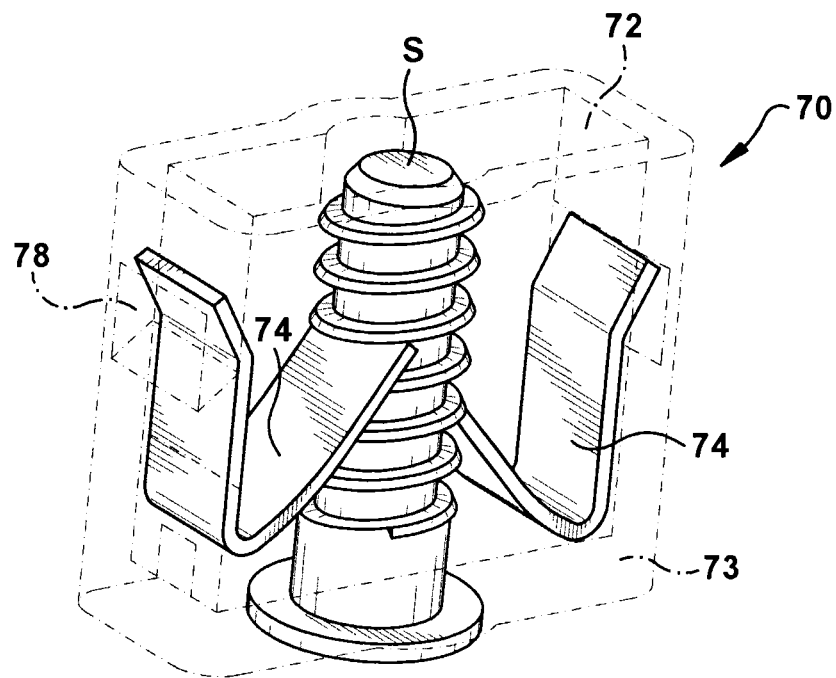
FIG. 6 illustrates a perspective view of a butterfly clip fastener in an embodiment of the invention.
Figure 7:
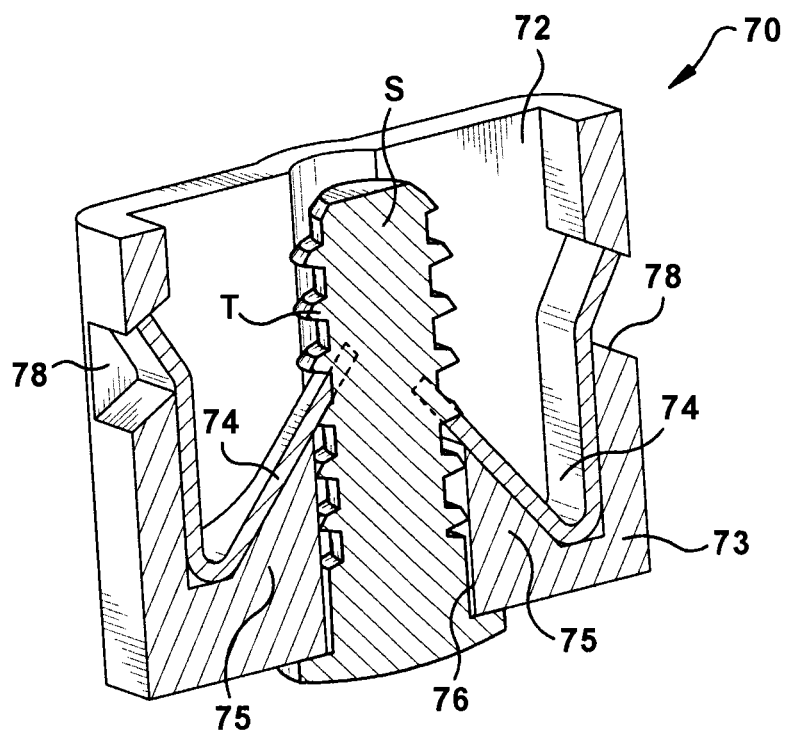
FIG. 7 illustrates a cross-sectional perspective view of the butterfly clip fastener of FIG. 6.

An alternative embodiment of the push-on clip fastener is illustrated in FIGS. 6 and 7. FIGS. 6 and 7 illustrate an embodiment directed to a butterfly clip fastener 70. The butterfly clip fastener 70 may be of any appropriate shape, size, type or configuration. The butterfly clip fastener 70 may be fabricated by any appropriate means and out of any appropriate materials, such as being fabricated as a multi-piece assembly.

The butterfly clip fastener 70 may include a housing 72 and at least one spring 74. The housing 72 may be of any appropriate shape, size, type or configuration, such as a generally five-sided rectangular shaped box. The housing 72 may be fabricated by any appropriate means, such as by injection molding. The housing 72 may be located at any appropriate position on the butterfly clip fastener 70.

The housing 72 may include an aperture 76. The aperture 76 may be of any appropriate shape, size, type or configuration, such as of a generally circular or square configuration. The aperture 76 may be located at any appropriate position on the butterfly clip fastener 70, such as at an approximately central location on a base 73 of the housing 72.

The housing 72 may also include at least one interior form 75. The housing 72 may include any appropriate number of interior forms 75, such as a pair of interior forms 75. The interior forms 75 may be of any appropriate shape, size, type or configuration, such as of generally angular configurations. The interior forms 75 may be located at any appropriate position on the butterfly clip fastener 70, such as within the housing and located adjacent to the base 73. The interior forms 75 may be an integrally formed part of the base 73 and housing 72.

The housing 72 may include at least one notch 78. The housing 72 may include any appropriate number of notches 78, such as a pair of notches 78. The notches 78 may be of any appropriate shape, size, type or configuration, such as of a generally triangular shape. The notches 78 may be located at any appropriate position on the butterfly clip fastener 70, such as adjacent an open end of the housing 72. For example, notches 78 may be located on opposite sides of the housing 72.

The springs 74 may be of any appropriate shape, size, type or configuration. The springs 74 may be fabricated by any appropriate means, such that the springs 74 may be stamped steel springs. The springs 74 may be located at any appropriate position on the butterfly clip fastener 70, such as within the housing 74 and located on each side of the housing 72. For example, the springs 74 may be located on either side of the aperture 76, whereby the springs 74 may abut and rest within the interior forms 75.

The housing 72 may hold the springs 74, whereby ends of the springs 74 may be staggered to match the pitch of a stud S. The ends of the springs 74 may contact threads T of the stud S simultaneously. The opposite ends of the springs 74 may be located within the notches 78, whereby the notches 78 may aid in retaining the springs 74.

In a non-limiting example, the operator may press the butterfly clip fastener 70 over the stud S that may be located through the aperture 76 of the housing 72. After the butterfly clip fastener 70 is fully seated, the operator may rotate the butterfly clip fastener 70 a "quarter turn" to apply the required clamp load.

Figure 8:
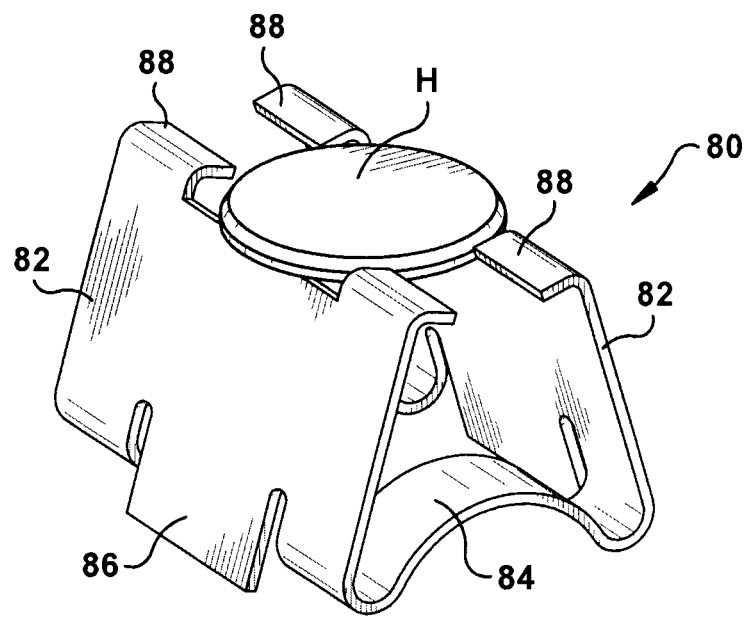
FIG. 8 illustrates a perspective view of a stud clip fastener in an embodiment of the invention.
Figure 9:
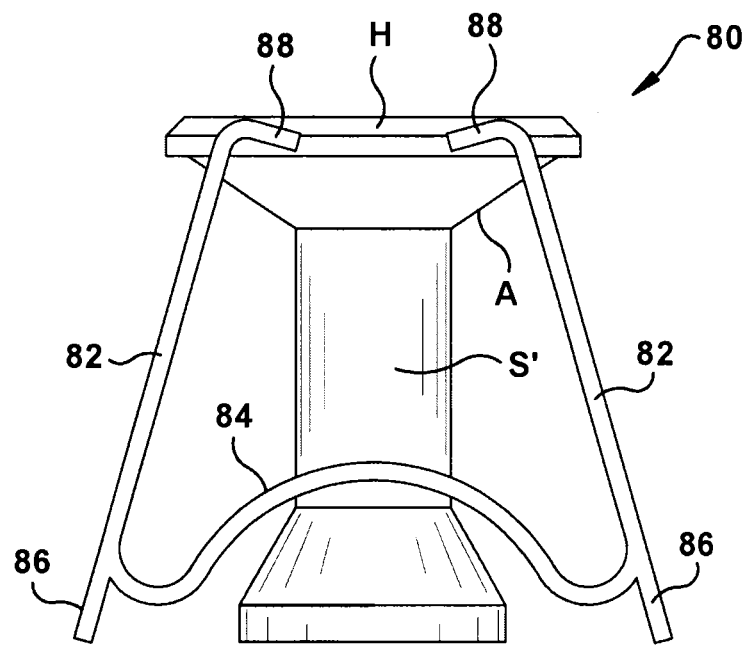
FIG. 9 illustrates a side view of the stud clip fastener of FIG. 8.

An alternative embodiment of the push-on clip fastener is illustrated in FIGS. 8 and 9. FIGS. 8 and 9 illustrate an embodiment directed to a stud clip fastener 80. The stud clip fastener 80 may be of any appropriate shape, size, type or configuration. The stud clip fastener 80 may be fabricated by any appropriate means and out of any appropriate materials, such as being fabricated as a one-piece stamped product made from spring steel.

The stud clip fastener 80 may require a unique stud S' design. In this embodiment, the stud S' utilized may not have any threads. Instead, the stud S' may include a head H with a tapered or angled base A. The angled base A may be located under the head H.

The stud clip fastener 80 may include two sides 82 and at least one arch 84. The sides 82 may be of any appropriate shape, size, type or configuration, such as of a generally planar square or rectangular configuration. The sides 82 may be located at any appropriate position on the stud clip fastener 80, such as generally opposite one another. Each side 82 may include at least one tab 86 and at least one fold 88.

The stud clip fastener 80 may include any appropriate number of arches 84. For example, the stud clip fastener 80 may include a pair of arches 84. The arches 84 may be of any appropriate shape, size, type or configuration, such as of a generally semi-circular curved shape. The arches 84 may be located at any appropriate position on the stud clip fastener 80, such as at an end of each side 82, whereby the arches 84 may connect and span the distance between each side 82.

The tabs 86 may be of any appropriate shape, size, type or configuration, such as of a generally rectangular or square configuration. The tabs 86 may be located at any appropriate position on the stud clip fastener 80, such as at a generally lower central location on each side 82. The folds 88 may be of any appropriate shape, size, type or configuration, such as of a generally curved configuration. The folds 88 may be located at any appropriate position on the stud clip fastener 80, such as at an opposite end of each side 82 as that of the tabs 86. For example, the folds 88 may be located at each end of each side 82.

In a non-limiting example, to install the stud clip fastener 80, the operator may push or force it over the head H of the stud S'. When the stud clip fastener 80 is seated, the sides 82 may slip under the head H of the stud S'. The spring action of the sides 82, due to the arches 84, may cause the stud clip fastener 80 to continually tighten around the stud S'. The angle A on the under side of the stud S' may thereby reduce the tendency of the stud clip fastener 80 to loosen under a load. The stud clip fastener 80 does not require a "quarter turn" to be assembled.

As an alternative embodiment of the push-on clip fastener, there may be a pinching stud clip fastener (not shown). The pinching stud clip fastener may be of any appropriate shape, size, type or configuration. The pinching stud clip fastener may be fabricated by any appropriate means and out of any appropriate materials. The pinching stud clip fastener may be a combination of one or more of the elements from the embodiments illustrated in FIGS. 1-9. In this embodiment, the fastener may open around the stud S, thereby providing for ease of assembly.

Although the embodiments of the present invention have been illustrated in the accompanying drawings and described in the foregoing detailed description, it is to be understood that the present invention is not to be limited to the embodiments disclosed, but that the invention described herein is capable of numerous rearrangements, modifications and substitutions without departing from the scope of the claims hereafter.

Having thus described the invention, the following is claimed:

1. A push-on clip fastener for securing two components together, said push-on clip fastener comprising:
    a housing including an aperture configured to receive a stud of one of the two components;
    a cover;
    at least one leg attached with said cover, said at least one leg inserted into said housing;
    a generally curved spring positioned within said housing, said spring having a slot, wherein said slot is generally aligned with said aperture and configured to receive the stud of one of the two components; and
    wherein said at least one leg inserted into said housing engages said curved spring causing said curved spring to straighten providing a clamp load.

2. The push-on clip fastener of claim 1, wherein said housing includes projections located on each side of said housing.

3. The push-on clip fastener of claim 2, wherein said cover includes retaining features located on each side of said cover whereby said retaining features selectively engage with said projections engaging said cover with said housing.

4. The push-on clip fastener of claim 3, wherein said retaining features include wings.

5. The push-on clip fastener of claim 1, wherein said at least one leg includes a pair of legs inserted into said housing.

6. The push-on clip fastener of claim 1, wherein said at least one leg is configured to be inserted into said housing to rotate said spring.

7. The push-on clip fastener of claim 6, wherein the stud comprises a threaded stud, wherein said threaded stud is inserted into said aperture of said housing wherein rotating said spring causes said spring to engage threads of said threaded stud.

8. A push-on clip fastener for securing an interior automotive component to a stud, said push-on clip fastener comprising:
    a housing including an aperture, wherein said housing is configured to receive a stud securing the interior automotive component there between;
    a cover including a pair of legs, wherein said legs are inserted within said housing;
    a generally curved spring positioned within said housing, said curved spring including a slot aligned with said aperture and a break having edges located axially above said slot, wherein said slot is configured to receive the stud; and
    wherein said legs being inserted into said housing engages said curved spring causing said curved spring to straighten and provide a clamp load.

9. The push-on clip fastener of claim 8, wherein said slot allows said spring to rotate within said housing.

10. The push-on clip fastener of claim 9, wherein said spring is configured to rotate and distort until the break edges engage a thread in the stud.

11. The push-on clip fastener of claim 8, wherein said legs act as wedges as said cover is pressed into said housing.

12. The push-on clip fastener of claim 11, wherein said legs drive said break edges into the stud.

13. The push-on clip fastener of claim 12, wherein as both edges of the break are engaged into threads of the stud, said legs of said cover wedge said spring causing said spring to straighten.

14. The push-on clip fastener of claim 13, wherein said straightening causes said clamp load.

15. A push-on clip fastener for securing two components together, said push-on clip fastener comprising:
    a housing having an aperture configured to receive a stud of one of the two components;
    a cover engaged with said housing;
    at least one leg extending from said cover and into said housing; and
    a generally curved spring positioned within said housing and configured to receive the stud of one of the two components, wherein said at least one leg engages said curved spring causing said curved spring to straighten and provide a clamp load.

16. The push-on clip fastener of claim 15, wherein said spring includes a slot generally aligned with said aperture and a break having edges located axially above said slot.

17. The push-on clip fastener of claim 16, wherein said spring rotates and distorts until said break edges engage a thread in the stud inserted into said aperture of said housing.

18. The push-on clip fastener of claim 17, wherein said at least one leg drives said break edges into the stud.

19. The push-on clip fastener of claim 18, wherein said cover includes retaining features located on each side of said cover whereby said retaining features selectively engage with said housing engaging said cover with said housing.

* * * * *